Dec. 13, 1960     J. P. FIELD     2,963,783
SHEET METAL FITTINGS
Filed July 31, 1957     2 Sheets-Sheet 2
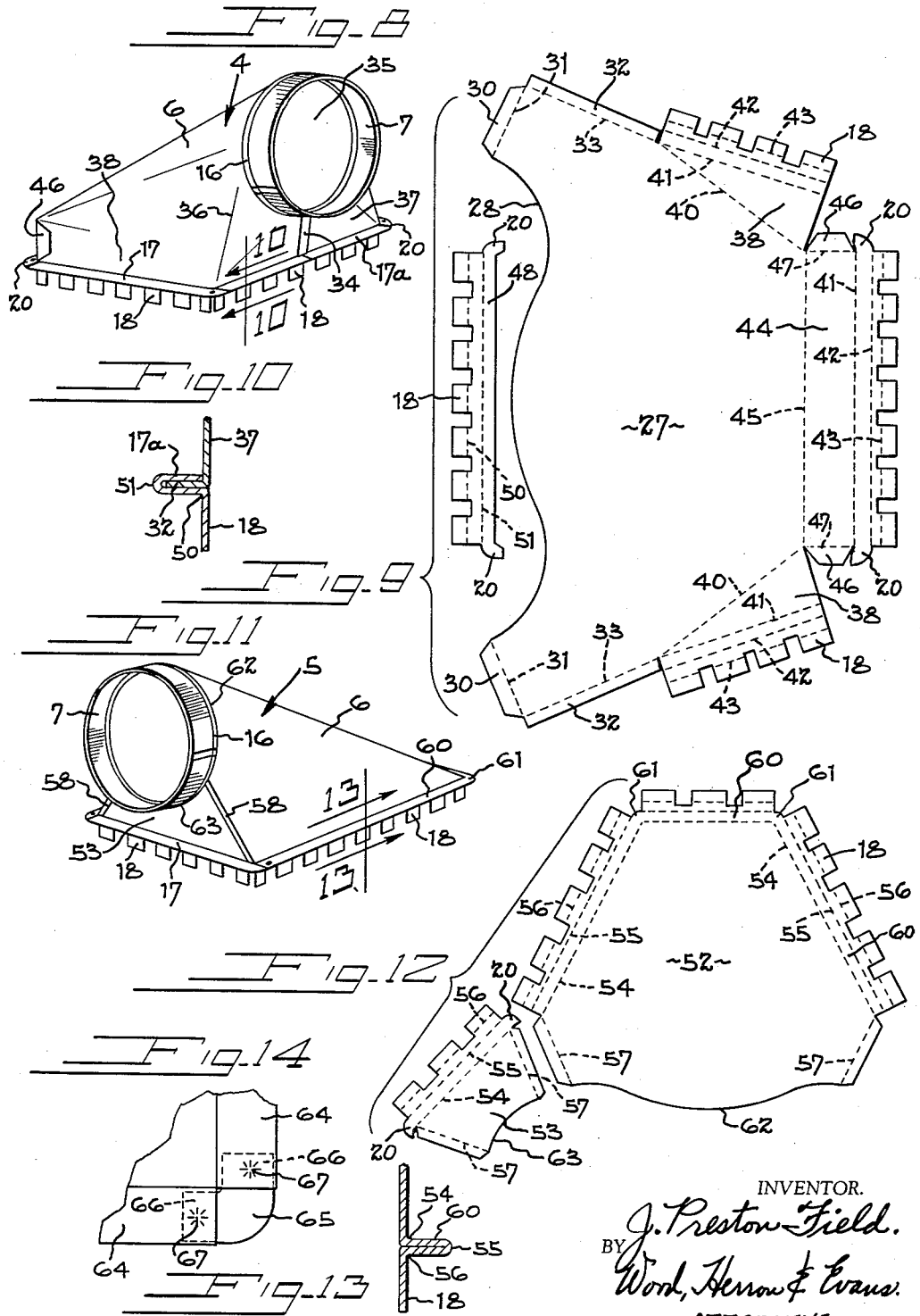
INVENTOR.
J. Preston Field.
BY
Wood, Herron & Evans.
ATTORNEYS.

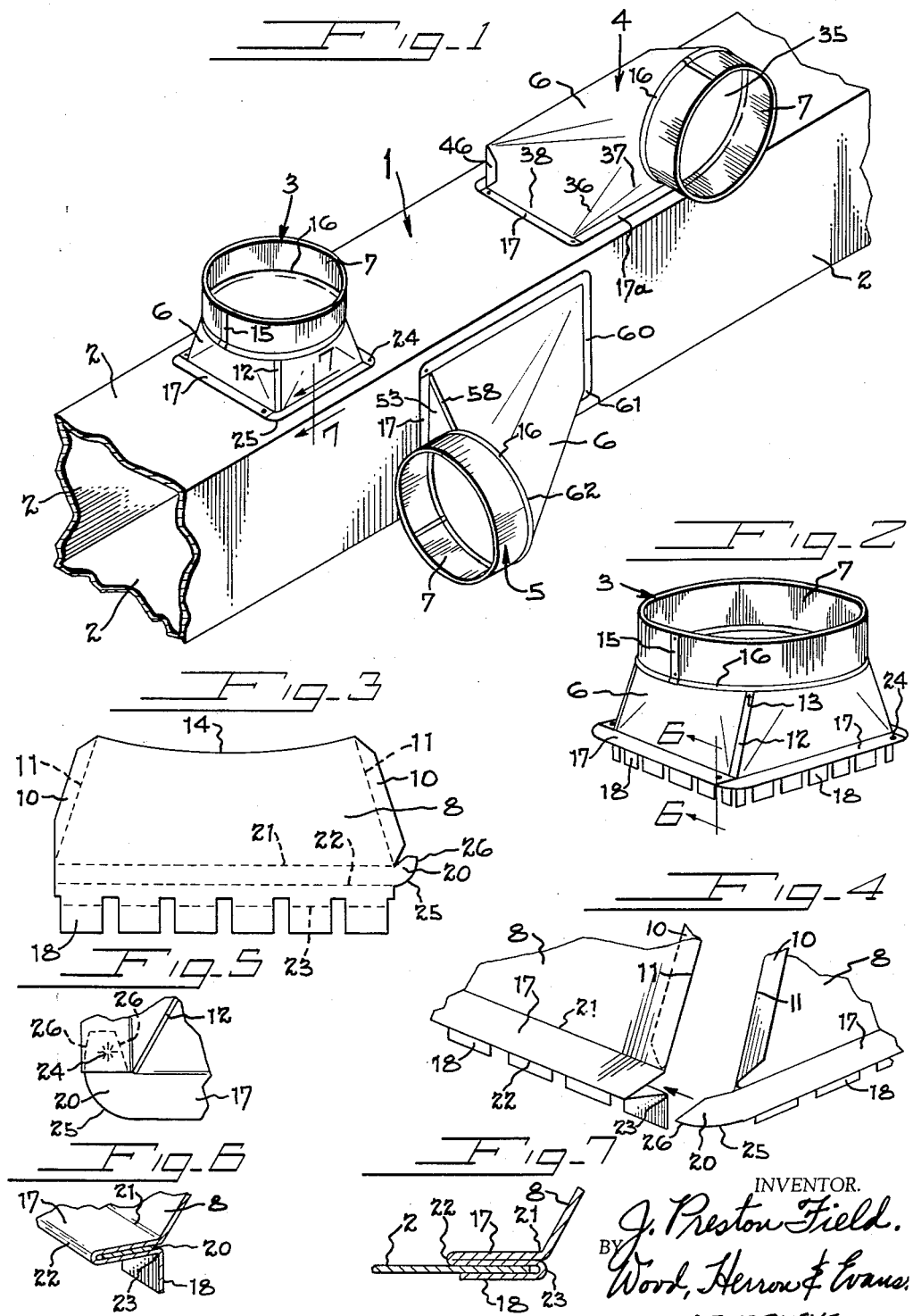

2,963,783

SHEET METAL FITTINGS

Jesse Preston Field, Falmouth, Ky., assignor to The Williamson Company, Cincinnati, Ohio, a corporation of Ohio Filed July 31, 1957, Ser. No. 675,384

6 Claims. (Cl. 29—190)

This invention relates to sheet metal ductwork fittings of the type used in heating, ventilating, and air conditioning systems. In such systems, the main air supply is conveyed through sheet metal ducts leading from a central source such as a fan, warm air furnace, air conditioning system or unit embodying all of such facilities, and branch lines lead from the duct at the points of discharge in various rooms or at various locations within a room. The present invention is addressed particularly to so-called take-off fittings through which branch lines are supplied from the plenum chamber or main ducts. Such take-off fittings may be in the form of elbows, reducers, or the like.

The principal objective of the present invention has been to provide an improved construction through which a fitting fabricated of sheet metal may readily be associated with a wall or panel section of a duct in a substantially air-tight manner, whereby apertures or crevices through which air might otherwise escape will be eliminated.

A further objective of the present invention has been to provide improvements in the construction of sheet metal fittings which will accomplish this purpose without increasing or substantially increasing costs of manufacture, and which may be installed at the job site in the same manner that conventional fittings are now used.

A typical duct system of the type used in conjunction with warm air furnaces, in a household for example, consists of a plenum chamber, as a main distribution conduit, and branch lines of smaller cross-sectional area extending therefrom to outlets installed in the floors or walls of the various rooms of the home. The main conduit usually is rectangular in cross section, and the branch lines are tapped thereto by provision of openings cut into the walls thereof.

In the typical installation, the plenum chamber, conduit sections, branch lines, and necessary take-off fittings, as well as all of the elbows, reducers, and the like, are fabricated at a manufacturing plant and are assembled piece-by-piece on the job. It is impractical to cut openings in the main conduit fittings at the factory since the exact locations are governed by conditions existing on the job which are not foreseeable beforehand. Therefore, in erecting a typical installation the openings for the branch lines are cut by hand into the walls of the main conduit incidental to erection thereof. For this purpose, the tinsmith marks the size of the opening on the wall at the intended location, pierces the wall sufficiently to insert a tinsnip, and then cuts by hand along the marked lines where the opening is to appear.

The usual take-off fitting is rectangular in cross section at the area where it connects to the plenum chamber or main conduit and is equipped with laterally projecting flanges along its side walls which are adapted to overlie the wall of the main conduit marginally adjacent the edge of the opening. The take-off fitting is fastened in place over the opening either by screws extending through the flange or by tabs extending beyond the flanges which, after placement of the fitting, are bent against the inside surface of the conduit walls.

Take-off fittings, as conventionally manufactured heretofore, are either of substantially one-piece construction in which the ultimate shape is developed from a bent-up blank, or of an assembly of sheet metal pieces appropriately shaped and joined to one another to provide the ultimate shape. In either instance, however, the flanges through which the fitting is adjoined to the main conduit, are co-extensive only with the adjacent side and end walls, and gaps exist at the corners. Because of such construction, it is apparent that unless the contractor or workman cuts the opening carefully and accurately into the wall of the main duct, apertures or openings will or may exist at one or more of the corner areas where the fitting does not overlap the main duct wall. In modern design, in order to permit utilization of ducts which are as small as possible in cross-sectional area, it is conventional to distribute the air, whether heated or chilled as the case may be, at relatively high pressure and velocity; in fact, such practice is necessitated wherever the building construction requires installation of ducts in the spaces between joists or beams. Thus, because of high pressure which exists in the main ducts, air loss through any openings or crevices existing at the points of juncture of the fittings with the main duct work, assumes significant proportions. This is particularly true in air cooling systems because of the cost of reducing air temperature is appreciable.

In accordance with this invention, fittings are provided which are adapted for connection to or installation upon ducts in the conventional manner with which those skilled in the art are familiar, but the fittings of the present invention are characterized by the provision of flanges which are closed, joined, or interconnected at the corner areas so that each fitting is equipped with a peripherally continuous sealing member at the area wherein it joins a main duct or other supply conduit. As subsequently explained in detail, the corner closures may be formed or provided as integral portions of developed blanks from which the fittings are constructed or may be furnished as supplemental elements or inserts. In either event, however, the closed corner fittings of the present invention, which may be conventional in other respects, eliminate air loss through cracks or crevices which might otherwise exist, and thereby provide substantial improvement in the cost of operation of a system of which they form a part.

A further advantage is provided by the closed corner fittings of the present invention with respect to the rigidity which the joining of the corners imparts to the fitting itself. Because the flanges extend around the corners or are joined to one another at the corners, the hinging action is prevented which might otherwise occur through bending of the relatively thin sheet metal at the corner junctures of the side walls. Thus, the fittings of the present invention do not become out-of-square during transportation to the job site or through handling incidental to erection.

In the several fittings disclosed herein, which embody the principles of the invention, the body or bonnet of the fitting is rectilinear in outline, and the base flanges project outwardly from the sides of the body with their ends residing adjacent one another at the corners. The corner closures or sealing tabs span the spaced ends of the flanges and thus provide a composite base flange extending about the periphery of the body, which seats upon the external surface of the duct wall. The opening in the duct wall, with which the fitting communicates, also is of rectilinear outline corresponding to the body. In the fittings disclosed, the composite base flange is secured in position by a skirt, in the form of bendable tabs depending downwardly from the base flange, the skirt being generally in plane with the sides of the body and interfitting the opening in the duct wall. When the flange is installed, the skirt tabs are bent outwardly into clinching engagement with the internal surface of the duct wall, thus drawing the base flange in clamping engagement with the external surface of the wall marginally adjacent the opening.

Other features and advantages of the invention are described with reference to the accompanying drawings in which the improvement is disclosed in relation to representative types of fittings in which the present invention has been incorporated.

In the drawings:

Figure 1 is a general perspective view of a sheet metal duct or manifold leading from a plenum chamber, illustrating several different types of sheet metal take-off fittings of the present invention installed thereon.

Figure 2 is a perspective view of one of the fittings of Figure 1, showing the assembled fitting before installation on the duct.

Figure 3 illustrates one of the sheet metal stampings from which is fabricated the bonnet portion of the fitting shown in Figure 2.

Figure 4 is a fragmentary perspective view showing a corner portion of two of the sheet metal stampings bent partially to final shape, illustrating the insertion of the corner sealing tab of the fitting at assembly.

Figure 5 is a fragmentary top plan view of the completed corner seal.

Figure 6 is a sectional view taken along line 6—6 of Figure 2, further illustrating the sealed corner construction.

Figure 7 is an enlarged sectional view taken along line 7—7 of Figure 1, illustrating the base portion of the bonnet in clinching engagement with the wall of the duct.

Figure 8 is a perspective view of the second form of outlet fitting shown in Figure 1 which embodies the principles of the invention.

Figure 9 illustrates the sheet metal stampings from which the fitting of Figure 8 is fabricated.

Figure 10 is an enlarged sectional view taken along line 10—10 of Figure 8, illustrating the base flange construction.

Figure 11 is a perspective view of the third type of take-off fitting of Figure 1, embodying the principles of this invention.

Figure 12 illustrates the sheet metal stampings from which the fitting of Figure 11 is fabricated.

Figure 13 is an enlarged sectional view taken along line 13—13 of Figure 11, illustrating the base flange construction in this type of fitting.

Figure 14 is an enlarged fragmentary top plan view showing a modified corner construction utilizing separate tab inserts to seal off the corners of the fitting.

*General arrangement*

Referring to Figure 1, the main distributor duct of a heating, ventilating, or air conditioning system is indicated at 1. The duct is of conventional construction and its walls 2 are provided with outlet openings to receive the sheet metal take-off fittings of this invention. Three representative types of fittings indicated generally at 3, 4 and 5 have been selected to illustrate the principles of the invention. The fittings are seated in the wall openings and provide an air-tight connection with the walls of the duct as described in detail below. Each fitting consists in general of a square or rectangular bonnet or converging throat, indicated generally at 6, joined to the wall of the duct and terminating in a cylindrical collar 7 providing a connection for the conventional branch ducts which distribute the air to the points of discharge, throughout the building in the usual manner.

It will be understood that the fitting structures of this invention are intended for general utility in providing an air-tight connection with sheet metal ducts, jackets or panel sections in any distribution system which involves the problem of air leakage. The fittings are also intended for systems having branch ducts or pipes which are rectangular or square in cross section; in this case, the circular collar 7 illustrated in the drawings is replaced with a square or rectangular throat or collar to match the cross section of the branch ducts.

*Straight fitting*

The straight take-off fittings 3, illustrated in Figures 2–7, are fabricated from four sheet metal stampings or blanks indicated at 8 (Figure 3), the blank panels 8 being assembled to form the bonnet 6. For this purpose, the marginal edge portion 10 of each blank 8 is bent along the line 11 to create the lap joints 12 (Figure 2) at the four corners of bonnet 6 upon assembly of the blanks 8. Each seam or lap joint is formed by doubling the marginal portion 10 over the edge portions of the stamping to create a flange, such that one seam flange 10 resides in spaced relation to the external surface of the stamping and the opposite flange resides at the internal surface. After the flanges are bent, the mating inner and outer seam flanges of adjoining panels may be brought into interfitting relationship as indicated in Figure 4; thereafter, the interfitted flanges may be crimped under pressure to lock them permanently together as an air-tight interface, according to conventional practice. In the present structure, the completed seam 12 is permanently united by spot welding as at 13 after crimping. As explained later, the air-tight corners of the base flanges are brought into assembly at the same time the seam flanges 10 are interconnected.

The upper edge of each stamped panel 8 is curved as at 14, the curved edges creating a circular opening when the panels are assembled. The connector collar 7 is formed from a sheet metal band having its outer edge portion corrugated in the usual way, the free ends of the collar being joined by the seam 15. The collar is joined to the bonnet (edges 14) by the circular seam 16, which is formed on a suitable machine according to conventional practice.

As best shown in Figure 2, the bonnet 6 is provided with a base flange 17 which is square, as viewed from above. The base flange seats upon the external surface of duct wall 2 and it is secured in place by a skirt 18 which, as best shown in Figure 2, projects downwardly from the base flange 17. The skirt is in the form of individual, deformable tabs and fits within the opening of wall 2. After the fitting is inserted in the opening, with the base flange 17 seated upon wall 2 about the opening, the tabs of skirt 18 conveniently are bent into clamping engagement with the marginal portion of wall 2 surrounding the opening (Figure 7). The base flange and its sealed corners, as described below, provides a composite frame in sealed connection with the external surface of wall 2.

In the embodiment of the invention shown in Figures 2–7, the four corners of base flange 17 are joined and closed off by sealing tabs 20 which interengage the base flange. For this purpose, the base flange is formed by doubling over the lower margins of panel 8, tabs 20 being inserted between the sections of the base flange during assembly of the bonnet sections. Referring to Figure 3, each stamped panel 8, as blanked out, includes one sealing tab 20 as an integral part thereof. The base flange is formed by bending the lower edge portion of the panel along the three bend lines indicated at 21, 22 and 23.

In fabricating the bonnet, each panel 8 is bent to provide the seam flanges 10 as noted above, and the base flange 17 is partially formed by doubling the lower marginal portion of the panel outwardly along the bend lines 21, 22 and 23. Thus, the base flange is joined to panel 8 along the bend lines 21 and the skirt 18 is joined to the base flange along the bend line 23. The partially formed base flange is shown in Figure 4. As shown in this view, the sealing tab 20 of each panel 8 projects outwardly as an integral part of the upper section of the partially formed base flange. When the seam flanges 10 of the adjacent panels are interengaged for the crimping operation, the sealing tab at each corner resides between the open sections of the base flange. In the relationship shown in Figures 2 and 4, the sealing tab resides at the left edge of each panel for insertion into the right end of the adjacent open base flange.

After the tabs are inserted at the four corners, with the seam panels interengaged, the base flange 17 is crimped shut by suitable dies (Figure 6), the tabs 20 being embraced between the upper and lower metal sections of the base flange in sealed connection. The tabs preferably are joined permanently to the metal sections of the base flange by spot welding as at 24. In addition to its sealing function, the spot welded tabs stiffen the base flange and impart rigidity to the structure, since the welded tab creates a continuous base flange surrounding the lower edge of the bonnet. In the form illustrated, the exposed portion of each sealing tab is curved as at 25. For convenient assembly, the side edges 26 of the tab converge toward one another as indicated.

*Elbow fitting*

The second type of outlet fitting 4 (Figure 8), provides a connection for a branch duct which may extend at right angles to the axis of the main distributor duct 1. This fitting, which is also known in the industry as an "elbow boot," illustrates a modified version of the corner seal. The bonnet, previously indicated at 6, is fabricated from two sheet metal stampings, as shown in Figure 9. The main stamping 27 has a curved edge 28 leading to a pair of seam flanges 30—30 delineated by the bend lines 31. The side edges of the stamping, adjoining the seam flanges 30, are provided with base flanges 32—32 delineated by bend lines 33.

In erecting the bonnet, the stamping is bent along the curved edge 28 to provide a circular opening and the seam flanges 30 are overlapped and attached together to provide the front seam indicated at 34 in Figure 8. The portions of the stamping below the opening 35 are bent along the lines 36 (Figure 8) to form the front wall 37 of the fitting, causing the base flanges 32 to reside end-to-end at the lower edge of the front wall.

The side walls 38—38 of the fitting are delineated by the bend lines 40—40. The outer portion of each side wall panel 38 is bent along the bend lines 41, 42 and 43 to form a base flange 17 and skirt 18 similar to the base flange and skirt described above with reference to Figure 2.

The rear wall of the fitting is formed by the rear wall panel 44 which is delineated by the bend line 45. The outer portion of the rear wall panel is bent along a second set of lines 41, 42 and 43 which form the base flange and skirt along the rearward wall of the bonnet, similar to the side walls. The endwise portions of the rear wall panel 44 are provided with flaps 46—46 delineated by bend lines 47. In the erected bonnet, the flaps 46 are bent to overlie the side walls 38 at opposite sides and may be secured by spot welding (Figure 8).

The corners of the base flange 17 (Figures 8–10) are joined in sealed connection by corner tabs 20 similar to the tabs described earlier. However, in this structure, the tabs for the front wall 37 are part of a stamped strip 48 (Figure 9) which is separate from the main blank 27. Strip 48 is bent along lines 50 and 51 to form that portion of the base flange and skirt which extends along the front wall 37. This portion of the base flange is indicated at 17a in Figure 8. In erecting the bonnet, the base flange 32 along the front wall 37 is bent so as to project outwardly as indicated in Figure 10. The strip 48 is bent along its lines 50 and 51 and is crimped over the end-to-end flanges 32, with the skirt portion 18 depending downwardly. The strip then may be permanently joined to the flange 32 by spot welding. When strip 48 is thus attached to the flange, the sealing tabs 20—20, which are formed at opposite ends of the strip project outwardly beyond the side walls 38 of the fitting.

The base flange along the side walls and rear walls is partially bent to shape in the manner shown in Figure 4, such that the sealing tabs 20, which project from the rear wall, may be inserted between the partially opened sections which subsequently form the base flanges along the side walls. The sealing tabs of strip 48 are inserted endwise between the flanges at the forward ends of the partially bent base flange. Thereafter, the flange is crimped in pressure engagement with the tabs and the tabs are spot welded as explained earlier.

When the bonnet stamping is bent to shape, the curved edge 28 of the main stamping 27 completes a circular opening to receive the collar 7 which is joined to the opening by a circular seam 16. The body of the bonnet blends progressively from a partially cylindrical shape at the collar to a rectangular shape as delineated by the base flange 17. The assembled fitting is attached to its opening of main duct 1 by bending the skirt tabs 18, as described previously with reference to Figure 7.

*Elbow fitting—second type*

The elbow fitting 5 (Figures 11–13) is similar to the form shown in Figure 8 except that its front wall is formed by a separate stamping instead of being bent from the main stamping. The sheet metal stampings for this fitting are shown in Figure 12, the main stamping being indicated at 52 and the front wall stamping being indicated at 53. The base flange 17 and skirt 18 of this structure are delineated by the bend lines 54, 55 and 56 of stampings 52 and 53. The front wall 53 is joined to the forward edges of the main stamping 52 by bending the margins of the main stamping and front wall stamping along the bend lines 57 to form seam flanges which subsequently overlap in locking engagement with one another to create the corner seams 58, as described with reference to Figure 4. The front wall stamping 53 is provided with sealing tabs 20—20 projecting outwardly from opposite side edges.

In fabricating the fitting, the bonnet is bent to the required configuration from the main stamping 52 and the base flange is partially formed along its bend lines 54—56, with skirt 18 depending downwardly, as explained earlier with reference to Figure 4. The front wall stamping 53 is also bent to provide the base flange and skirt, with the sealing tabs projecting outwardly beyond the partially over-folded base flange sections. Upon assembling the front wall and interengaging the mating seam flanges, the sealing tabs 20 of the front wall enter the space between the partially closed base flange sections as in Figure 4. With the tabs in place, the base flange sections are clinched into engagement with the tabs; thereafter, the corners are spot welded to attach the tabs permanently at the front corners.

In this form of the invention, the tabs 20 are omitted at the rearward corners of the base flange; instead, the base flange section 60 of the main stamping extends continuously around the corner. As shown in Figure 12, the rearward corners of the flange section 60 include curved connecting sections 61—61. When the base flanges 20 of the main stamping are bent to shape along the lines 54—56, the section 60 forms the upper section of the base flange and its connecting sections 61 extend around the corners and provide the corner seals.

As shown in Figure 11, the cylindrical collar 7 is joined to the curved edges 62 and 63 of the stampings by a seam 16 as described with reference to Figure 2. These curved edges delineate a circular opening for the collar.

The structure shown in Figure 14 comprises a bonnet having overlapping base flange sections 64, preferably including a skirt (not shown) as described above. In this structure, the sealing tabs are completely omitted from the bonnet stampings; instead, a separate sheet metal tab 65 is inserted between the flange sections when they are partially closed as noted above. The tab 65 is generally right angular, providing the limbs 66—66 which reside between the flange sections. After the limbs are inserted, the flange sections are closed and spot welded to the limbs as at 67.

It will be seen from the foregoing, that the same principle is embodied in the several versions of the invention disclosed herein. In each case, the sealing tabs and base flange provide a continuous peripheral closure, and in each case, the tabs stiffen the fitting about its base and provide a rigid structure which resists bending or distortion in handling. Since the skirt clamps the base flange in seated engagement against the margin of the opening in the duct, the structure reliably closes off any air leaks which would otherwise exist.

Having described my invention, I claim:

1. A preformed flat blank of sheet metal for forming a fitting having an intake opening and an outlet opening, said fitting having a base flange adjacent said intake opening adapted to seat against the wall of an air duct with the intake opening in communication with an opening formed in the wall of the air duct, said blank comprising, a sheet metal panel having an upper edge adapted to form said outlet opening, said panel having respective marginal lap joint sections adapted to be doubled over along respective bending lines, said panel having parallel marginal base flange sections adapted to be bent along three parallel bending lines and to form a base flange having an upper section and a lower section, the upper of said bending lines intersecting the bending lines of said joint sections, said upper section of the flange base sections having an integral sealing tab projecting outwardly from at least one end thereof, said sealing tab being generally right angular in configuration and having a free end extending outwardly, one side of the sealing tab being adjacent the end of the marginal joint section and being separated therefrom by a V-shaped notch having a straight line sloping upwardly from the intersection of the bending line of said joint section and base section, the said doubled over marginal joint section adapted to interfit and to form a lap joint upon erection of the fitting, said base sections adapted to be folded outwardly along said three bending lines and to provide a base flange projecting outwardly adjacent said intake opening, said V-shaped notch adapting said sealing tab to remain in the plane of said upper base section upon erection of the fitting and to be inserted endwisely between the upper and lower sections of an adjacent base flange, thereby to extend across the space intervening between the adjacent ends of the base flanges to form a flush surface adapted to provide a sealing interface with the wall surface of said air duct upon installation of the fitting thereon.

2. A sheet metal blank according to claim 1 in which a sealing tab projects from one end of the upper section of the base flanges, whereby the sealing tab is adapted to be inserted endwisely between the adjacent upper and lower sections of the base flange of a similar blank upon erection of the fitting.

3. A sheet metal blank according to claim 2 in which a skirt extends outwardly beyond the lower section of the base flange, said skirt adapted to be clinched into engagement with the wall of an air duct adjacent an opening therein to clamp the base flange of the erected fitting in sealing engagement with the external surface of the air duct upon installation of the fitting.

4. A sheet metal blank according to claim 1 in which a single blank forms a fitting having a main panel, a pair of side walls, a front wall, and a rear wall upon being erected, the side and rear walls each having parallel base flange sections providing upper and lower sections, the upper base section of the rear panel having respective sealing tabs extending from opposite ends thereof and adapted to be inserted endwisely between the upper and lower base flange sections of the side panels upon erection of the fitting.

5. A sheet metal blank according to claim 4 having a single thickness marginal base flange section adapted to project outwardly from the front wall of the erected fitting in a plane common to the base flange section of the side and rear panels, combined with a separate blank in the form of a strip adapted to be doubled over upon the base flange of the front wall of the erected fitting to provide a base flange having upper and lower sections, said upper section having respective sealing tabs extending outwardly from opposite ends thereof adapted to be inserted endwisely between the adjacent upper and lower base flange sections of the side walls to provide a sealing interface therewith.

6. A sheet metal blank according to claim 1 in which a front wall blank forms the front wall of the fitting, combined with a main blank which forms the body of the fitting, said main blank having parallel base flange sections along the side and rearward edges thereof adapted to be bent along three bending lines to form base flanges each having an upper section and a lower section, said main blank and front wall blank having corresponding marginal lap joint sections adapted to be doubled over upon respective bending lines to form interfitted lap joints upon erection of the fitting, thereby to join the front wall blank to the fitting upon erection thereof, said front wall blank having respective sealing tabs extending outwardly from opposite ends of the upper base flange sections thereof adapted to interfit the upper and lower sections of the base flange of the main blank at opposite sides upon erection of the fitting.

References Cited in the file of this patent

UNITED STATES PATENTS

| | | |
|---|---|---|
| 296,786 | Rock | Apr. 15, 1884 |
| 565,499 | Pattison | Aug. 11, 1896 |
| 1,094,309 | Daw | Apr. 21, 1914 |
| 1,159,422 | Scannell | Nov. 9, 1915 |
| 1,416,334 | Connery | May 16, 1922 |
| 2,101,311 | Duncan | Dec. 7, 1937 |
| 2,130,161 | Shaw | Sept. 13, 1938 |
| 2,155,871 | Piker | Apr. 25, 1939 |
| 2,477,315 | Smith | July 26, 1949 |
| 2,799,518 | Anderson et al. | July 16, 1957 |

OTHER REFERENCES

Adelta Catalog No. 55, third edition, page 10, copyright 1955.

Standard Price Schedule 1216, page 10, effective date Dec. 1, 1956, Standard Furnace Supply Co., Omaha, Nebr.